3,322,826
POLYMERIZATION OF HEXAFLUOROPROPYLENE EPOXIDE

Earl Phillip Moore, Wilmington, Del., assignor to E. I. du Pont de Nemours and Company, Wilmington, Del., a corporation of Delaware
No Drawing. Filed Apr. 13, 1965, Ser. No. 447,879
12 Claims. (Cl. 260—544)

This application is a continuation-in-part of my copending application Ser. No. 186,645, filed Apr. 11, 1962, now abandoned.

The present invention relates to the polymerization of hexafluoropropylene epoxide and, more particularly, to the polymerization of hexafluoropropylene epoxide using ionic catalysts to give products having the general formula $$CF_3-CF_2-CF_2-O-[CF(CF_3)-CF_2-O-]_nCF(CF_3)-COF$$

where $n$ is the number of $-CF(CF_3)-CF_2-O-$ units in the molecule and $n+2$ is the degree of polymerization.

In accordance with the present invention, the polymerization of hexafluoropropylene epoxide is carried out by a process which comprises contacting hexafluoropropylene epoxide at a temperature of $-80$ to $+50°$ C. with a catalyst/diluent system selected from the group consisting of:

(a) monovalent metal fluorides dispersed in organic polar solvents;

(b) quaternary salts of elements of Group V–A having atomic numbers of 7 to 33 inclusive, dispersed in organic polar solvents; and (c) quaternary salts of elements of Group V–A having atomic numbers from 7 to 33 inclusive, dispersed in hydrocarbon solvents having from 4 to 15 carbon atoms, or dispersed in halogenated solvents having the general formula $R_1R_2CHCl$ weherin $R_1$ is a hydrogen or a halogen and $R_2$ is a halogenated alkyl radical having up to 12 carbon atoms, a hydrogen or a halogen.

The organic polar solvents used herein are defined as an organic compound, liquid at reaction temperatures, contain oxygen, nitrogen or sulfur in their chemical structure and are capable of dissolving potassium perfluoropropoxide to a concentration of at least 0.01 weight percent.

Catalytically active monovalent metal fluorides suitable for use in the present invention include, in particular, the alkali metal fluorides, i.e., LiF, NaF, KF, CsF and RbF. However, other monovalent metal fluorides, such as silver fluoride and thallous fluoride, also catalyze the polymerization of hexafluoropropylene epoxide. The alkali metal fluorides may be employed as such or admixed with other metal halides. The addition of the metal halide appears to enhance the activity of the fluoride. It has been found that the active catalyst in these systems is the monovalent metal perfluoropropoxide. Thus, highly active catalysts are formed from mixtures of CsF or KF with lithium halides, e.g., KF/LiCl, CsF/LiCl, KF/LiBr and CsF/LiBr.

A second group of monovalent compounds which catalyze the polymerization of hexafluoropropylene epoxide are quaternary salts of non-metallic elements in Group V–A of the Periodic Table as illustrated in the Handbook of Chemistry and Physics, Chemical Rubber Publishing Company, 37th Edition, page 392. These elements are nitrogen, phosphorus and arsenic and their quaternary salts have the general formulas $R_4N^+X^-$, $R_4P^+X^-$ and $R_4As^+X^-$, where R is a hydrocarbon radical and X is a salt ion. Although any quaternary salt of this type exhibits the catalytic activity, the halides, acetates and cyanides are preferred. The hydrocarbon group can be aliphatic or aromatic in nature and does not appear to be critical. The only critical feature apears to be the ionic nature of the compound which is, of course, characteristic of all of these onium compounds. Examples of catalytically active quaternary salts are tetramethyl ammonium chloride, tetrabutyl ammonium iodide, tetraethyl ammonium fluoride, trimethyl cetyl ammonium fluoride, triphenyl methyl phosphonium bromide, 1,2,4,6-tetramethylpyridinium iodide, triphenylmethyl arsonium bromide and dimethyldicetyl ammonium acetate. The quaternary salts described may also be combined with alkali metal halides. Such combinations improve the catalytic activity of the quaternary salts. Examples of such combinations are $KF/\varphi_3PCH_3^+Br^-$ and $CsF/\varphi PCH_3^+Br$.

The quantity of catalyst employed does not appear to be critical and is apparently not a factor which influences the degree of polymerization substantially, although the rate of polymerization is increased by larger concentrations. In general, the quantity of catalyst is in the range of 0.001 to 10 weight percent, based on the monomer.

The diluent employed in the process of the present invention in combination with the catalyst is defined as an organic polar solvent. In view of the great variety of diluents which can be employed in the polymerization of hexafluoropropylene epoxide employing the above-described ionic catalysts, it has not been possible to define the diluents by a generic chemical term. However, all diluents suitable in the polymerization can be characterized by the following criteria. Thus, all the organic polar solvents, as the term is here employed are organic compounds, i.e., compounds containing carbon, which are liquid at reaction conditions and which are capable of dissolving alkali metal perfluoroalkoxides. Although any of these alkoxides can be employed as a standard to distinguish operable and non-operable diluents, potassium perfluoropropoxide was chosen. Thus, if the diluent dissolves potassium perfluoropropoxide to a concentration of at least 0.01 weight percent, the diluent can be employed in the process of this invention and is an organic polar solvent. Potassium perfluoropropoxide is readily prepared by reaction of potassium fluoride and perfluoropropionyl fluoride. In particular, however, the preferred organic polar solvents are aliphatic polyethers having from 4 to 15 carbon atoms. These include ethylene glycol dimethyl ether, diethylene glycol dimethyl ether, triethylene glycol dimethyl ether, dioxane, acetonitrile, propionitrile, tetraglyme, benzonitrile and 1,2,3-tris(2-methoxyethoxy)propane. Other organic polar solvents include nitroethane, tetrahydrofuran, dimethyl sulfoxide, tetramethylene sulfone, acetone and methyl acetate. The hydrocarbons useful are, in general, saturated or nonethylenically unsaturated hydrocarbons, i.e., either aliphatic or aromatic hydrocarbons, having from 5 to 12 carbon atoms and include such solvents as n-heptane, n-decane, benzene, toluene and xylenes. Examples of halogenated hydrocarbons suitable as reaction media include dichloromethane, chloroform, 1,2-dichloroethane, 1,1,2-trichloroethane and compounds having the general formula $$H(CF_2)_n-CH_2Cl$$

where $n$ varies from 1 to 12.

The polymerization is generally carried out at a temperature within the range of $-60°$ to $+50°$ C., depending on the catalyst employed. Some catalysts are more active in the range of $0°$ to $+50°$ C., while others are equally active over the entire range. The reaction temperature also affects the degree of polymerization giving rise to higher molecular weight products at the lower temperatures, i.e., $-60°$ to $-20°$ C., that at the higher temperatures, i.e., above $-20°$ C. Pressure is not a critical factor and can be adjusted to best suit the mode of operation. Generally, the process is carried out at autogenous or low positive pressure. However, higher or lower pressures may be employed if desired. The quantity of diluent should be sufficient to allow efficient agitation of the reaction mixture, but otherwise is not critical. If desirable, a large excess of diluent may be employed without inhibiting the polymerization. The resulting polymeric product which is normally a liquid polymer having the above-described formula will vary in the degree of polymerization from 2 to about 25. The product is insoluble in the diluent and, thus, can be readily separated. If desired, polymers of differing degree of polymerization can be separated by distillation. Hexafluoropropylene epoxide, itself, having a B.P. of $-27\pm1°$ C. is preferably prepared by the oxidation of hexafluoropropylene using aqueous alkaline hydrogen peroxide.

The invention is further illustrated by the following examples.

*Example I*

A small platinum tube was charged with 0.05 g. of cesium fluoride and 4 ml. of acetonitrile in a dry box, then attached to a manifold, cooled with Dry Ice-acetone, evacuated and charged with 7 g. of hexafluoropropylene epoxide. The tube was sealed with a gas-oxygen torch and placed in an ice bath. After 16 hours at 0° C. the tube was discharged and the products being insoluble in the diluents were separated and distilled. There was obtained 0.8 g. of 2-perfluoropropoxypropionyl fluoride and 4.3 g. of a polymeric oil having the formula $$CF_3CF_2-CF_2-O\text{+}CF(CF_3)-CF_2O\text{+}_n CF(CF_3)COF$$

where $n$ varied from one to six.

*Example II*

The procedure of Example I was repeated using 0.05 g. of potassium fluoride instead of 0.05 g. of cesium fluoride. There was obtained 1.5 g. of 2-perfluoropropoxypropionyl fluoride and 5.1 g. of a polymeric oil having the formula

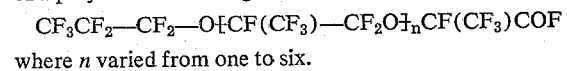
$$CF(CF_3)COF$$

where $n$ varied from one to six.

*Example III*

The procedure of Example I was repeated using 0.05 g. of rubidium fluoride instead of 0.05 g. of cesium fluoride. There was obtained 2.2 g. of 2-perfluoropropoxypropionyl fluoride and 4.1 g. of the polymeric hexafluoropropylene epoxide oil.

*Example IV*

The procedure of Example I was repeated using 0.05 g. of silver fluoride instead of 0.05 g. of cesium fluoride. There was obtained 5.0 g. of 2-perfluoropropoxypropionyl fluoride and 1.0 g. of the polymeric hexafluoropropylene epoxide oil.

*Example V*

The procedure of Example I was repeated using 0.01 g. of tetraethyl ammonium iodide instead of 0.05 g. of cesium fluoride. There was obtained 3.0 g. of 2-perfluoropropoxypropionyl fluoride and about 1.5 g. of hexafluoropropylene epoxide polymers of higher degree of polymerization.

*Example VI*

The procedure of Example I was repeated using 0.015 g. of tetramethyl ammonium chloride instead of 0.05 g. of cesium fluoride. The reaction was continued for 48 hours. There was obtained 2.5 g. of perfluoropropoxypropionyl fluoride and about 2 g. of hexafluoropropylene epoxide polymers of higher degree of polymerization.

*Example VII*

Into a 50 ml. glass reaction flask was charged under nitrogen 2 ml. of the dimethyl ether of diethylene glycol and 0.1 g. of cesium fluoride. The reaction vessel was cooled to 0° C., evacuated, charged with 13.6 g. of hexafluoropropylene epoxide and agitated for a period of 15 minutes. The pressure in the reaction vessel was atmospheric. The reaction was then cooled to $-80°$ C. and agitated at that temperature for 16 hours. The resulting reaction mixture was separated and 2.5 g. of polymeric hexafluoropropylene epoxide oil obtained.

*Example VIII*

Into a 50 ml. glass reaction flask was charged 2 ml. of the dimethyl ether of diethylene glycol and 0.1 g. of cesium fluoride. Hexafluoropropylene epoxide was then charged to the reaction vessel until a pressure $+5$ p.s.i. was attained. The vessel was agitated at a temperature of 25° to 30° for a period of one hour. The pressure was maintained at the indicated level by the further addition of the epoxide. The resulting product, being insoluble in the diluent, was separated and 57 g. of a polymer having the formula

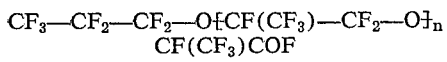
$$CF(CF_3)COF$$

where $n$ varied from 4 to 6, was obtained.

*Example IX*

Example VIII was repeated using as the diluent 2 ml. of the dimethyl ether of ethylene glycol. There was obtained 10.8 g. of a liquid polymer of hexafluoropropylene epoxide.

*Example X*

Example VIII was repeated using as the diluent 2 ml. of the dimethyl ether of triethylene glycol. The reaction was continued for 0.75 hours. There was obtained 43.6 g. of a liquid polymer of hexafluoropropylene epoxide.

*Example XI*

Example VIII was repeated using as the diluent 2 ml. of propionitrile. There was obtained 18.8 g. of a liquid polymer of hexafluoropropylene epoxide.

*Example XII*

Example VIII was repeated using as the diluent 2 ml. of trimethoxymethane. There was obtained 2 g. of liquid polymer of hexafluoropropylene epoxide.

*Example XIII*

Example VIII was repeated using 0.1 g. of hexadecyl trimethyl ammonium fluoride instead of the cesium fluoride as the catalyst. There was obtained 21.0 of liquid polymer of hexafluoropropylene epoxide.

*Example XIV*

Example VIII was repeated using 0.1 g. of tetramethyl ammonium chloride instead of the cesium fluoride. The reaction was continued for 30 minutes. There was obtained 5 g. of liquid polymer of hexafluoropropylene epoxide.

*Example XV*

Example VIII was repeated using 0.1 g. of triphenyl methyl phosphonium bromide instead of the cesium fluoride. The reaction was continued for 30 minutes. There was obtained 25.8 g. of liquid polymer of hexafluoropropylene epoxide.

*Example XVI*

Example XV was repeated except that 2 ml. of propionitrile was employed as the diluent. There was obtained 34.6 g. of liquid hexafluoropropylene epoxide polymer.

*Example XVII*

Example XV was repeated except that 2 ml. of n-heptane was employed as the diluent. There was obtained 4.0 g. of liquid polymer of hexafluoropropylene epoxide.

*Example XVIII*

Example XV was repeated except that 2 ml. of toluene was employed as the diluent. There was obtained 8.8 g. of liquid polymer of hexafluoropropylene epoxide.

Example XIX

Example XVI was repeated except that 0.1 g. of hexadecyltrimethyl ammonium fluoride was employed as the catalyst. There was obtained 37.8 g. of liquid polymer of hexafluoropropylene epoxide.

Example XX

Example VIII was repeated except that 2 ml. of 2-nitropropane was employed as the diluent. There was obtained 5 g. of liquid polymer of hexafluoropropylene epoxide.

Example XXI

Into a 50 ml. glass reaction flask was charged under nitrogen 2 ml. of the dimethyl ether of diethylene glycol and 0.1 g. of 1,2,4,6-tetramethyl pyridinium iodide. The reaction mixture was cooled to −40° C., evacuated and 8.5 g. of hexafluoropropylene epoxide was injected into the reaction vessel. The vessel was agitated at that temperature for an hour. On separation of the resulting reaction mixture, 5.2 g. of liquid polymer of hexafluoropropylene epoxide was obtained.

Example XXII

Example VIII was repeated except that 2 ml. of acetone was employed as a diluent. The reaction was continued for 30 minutes. On separation of the reaction mixture, 17.4 g. of a liquid polymer of hexafluoropropylene epoxide was obtained.

Example XXIII

Example XV was repeated except that 2 ml. of acetone was employed as a solvent. On separation of the reaction mixture 39 g. of a liquid polymer of hexafluoropropylene epoxide was obtained.

Example XXIV

Example XV was repeated except that 2 ml. of the diethyl ether of diethylene glycol was employed as a solvent. On separation of the reaction mixture 0.5 g. of a liquid polymer of hexafluoropropylene epoxide was obtained.

Example XXV

Example XV was repeated except that 0.1 g. of triphenyl methyl arsonium bromide was employed as a catalyst. On separation of the reaction mixture 25.5 g. of liquid hexafluoropropylene epoxide was obtained.

Example XXVI

Example XXV was repeated except that 2 ml. of propionitrile was employed as the diluent. On separation of the reaction mixture 30.1 g. of liquid polymer of hexafluoropropylene epoxide was obtained.

Example XXVII

Example XV was repeated except that 2 ml. of a compound having the formula

$$H(CF_2)_4CH_2OCH_2CH_2CN$$

was employed as the diluent. On separation of the reaction mixture there was obtained 4.9 g. of a liquid polymer of hexafluoropropylene epoxide.

Example XXVIII

Example XV was repeated using 3 ml. of methyl acetate as the diluent. On separation of the reaction mixture there was obtained 29.5 g. of a liquid polymer of hexafluoropropylene epoxide.

Example XXIX

Example XV was repeated using 4 ml. of methyl trifluoroacetate as the diluent. The pressure in this example was increased to 10 p.s.i. and the reaction time lengthened to 2 hours. On separation of the reaction mixture, 6.0 g. of liquid polymer of hexafluoropropylene epoxide was obtained.

Example XXX

Employing the procedure of Example XXI, 8.5 g. of hexafluoropropylene epoxide was polymerized with 5 ml. of the dimethyl ether of diethylene glycol and a catalyst mixture of 1.0 g. of cesium fluoride and 1 g. of lithium bromide and 7.6 g. of a liquid polymer of hexafluoropropylene epoxide was isolated from the reaction mixture ($n=1$ to 10).

Example XXXI

Example XXX was repeated except that 1.0 g. of rubidium fluoride was employed with the lithium bromide in 10 ml. of the ether. On separation of the reaction mixture, 5.6 g. of a liquid polymer of hexafluoropropylene epoxide was obtained.

Example XXXII

Example XXXI was repeated except that 1.0 g. of potassium fluoride and 0.5 g. of lithium bromide was employed as the catalyst. On separation of the reaction mixture, 6.5 g. of a liquid hexafluoropropylene epoxide polymer was obtained ($n=1$ to 10).

Example XXXIII

Example VII was repeated using 0.1 g. of triphenylmethyl phosphonium bromide and 0.1 g. of lithium bromide, instead of the cesium fluoride. The reaction was continued for 30 minutes. There was obtained a liquid polymer of hexafluoropropylene epoxide having the formula shown in Example VIII where $n$ varied from 1 to 12.

Example XXXIV

Repeating the procedure of Example XV, except that 2 ml. of a compound of a compound having the structure $HCF_2CF_2CH_2Cl$ is employed as the diluent, a liquid polymer of hexafluoropropylene epoxide is obtained.

Example XXXV

In a thoroughly dried 500 ml. glass flask equipped with a stirrer and protected from the atmosphere by a "Dry Ice"-cooled trap were placed 0.4 g. of dry cesium fluoride and 0.8 cc. of "tetraglyme" ($CH_3O(CH_2CH_2O)_4CH_3$) previously dried over $LiAlH_4$. The flask was cooled to −80° C. and 65 g. of hexafluoropropylene oxide was introduced. The reaction mixture was warmed to −38° C. and maintained between −32° C. and −38° C. for 44 hours. By this time it had become so viscous that stirring was no longer possible. There was then added 52 g. of hexafluoropropylene oxide at −32° C. Within 20 minutes the system became extremely viscous once again. The mixture was cooled to −80° C. and stored at this temperature for 344 hours without stirring. There was isolated 119 g. of product. An infrared spectrum indicated an average DP of 8. Distillation afforded 28 g. of oil boiling below 125° C. at 0.2 mm. and 33 g. of oil of B.P. 125° c. (0.2 mm.) to 240° C. (0.3 mm.). The higher molecular weight residue weighed 58 g. and had an average DP of 33.5 (analyzed by NMR and IR).

Example XXXVI

In a glass vessel equipped with a "Dry Ice"-cooled condenser, stirrer, and thermocouple were placed 7.06 g. of cesium fluoride (previously dried) and 12.7 ml. of 1,2,3-tris-(2-methoxyethoxy)propane (distilled from $LiAlH_4$). The vessel was cooled to −52° C. and 2000 g. of hexafluoropropylene epoxide was charged (temperature maintained below −43° C.). The reaction vessel was maintained at −50° C. for 22 hours at which point conversion was quite low (<5%). The temperature was raised to −27° C. for ½ hour and then lowered to −50° C. for 21 hours. Conversion still remained low. The temperature was again raised to −27° C. for 1 hour and lowerd to −40 to −45° C. for 58 hours. On work-up there was obtained 541 g. of oil (27%) of average molecular weight =2,000 (average DP=about 12).

The fluorocarbon polyethers produced by the process of the present invention are useful for a number of purposes. Thus, the low molecular weight polyethers, such as the dimer and the trimer can be converted into alkali metal salts and on pyrolysis result in vinyl ethers which can be homo- and copolymerized to result in high molecular weight resins of outstanding chemical and thermal stability. The fluorocarbon polyethers can also be directly employed as lubricants, dielectric media and heat transfer liquids. If desired, they can be decarboxylated directly in the presence of fluorine to result in products wtih fluorocarbon end groups which are chemically inert. Such oils and liquids are useful as solvents in addition to the uses mentioned for the unmodified polyether.

I claim:
1. A process for the preparation of polymer of the formula

wherein $n$ is the number of repeat units, comprising contacting hexafluoropropylene epoxide at a temperature of $-80$ to $+50°$ C. with a catalyst/solvent system selected from:
   (a) monovalent metal fluoride in an inert organic polar solvent which is capable of dissolving potassium perfluoropropoxide to a concentration of at least 0.01 weight percent, and
   (b) a quaternary salt of nitrogen, phosphorus, or arsenic in which the quaternary groups are hydrocarbon in
      (1) the solvent of (a),
      (2) a hydrocarbon solvent having from 5 to 12 carbon atoms, or
      (3) a halogenated solvent having the structure $R_1R_2CHCl$ wherein $R_1$ is H or Cl and $R_2$ is H, Cl, or a halogenated alkyl radical of 1 to 12 carbon atoms.

2. The process of claim 1 wherein the catalyst/solvent system is (a).
3. The process of claim 2 wherein the monovalent metal fluoride is alkali metal fluoride.
4. The process of claim 3 wherein the alkali metal fluoride is mixed with a different alkali metal halide.
5. The process of claim 3 wherein the alkali metal fluoride is KF or CsF.
6. The process of claim 2 wherein said solvent is the dimethyl ether of a polyethylene glycol.
7. The process of claim 6 wherein said glycol is triethylene glycol.
8. The process of claim 2 wherein said solvent is a hydrocarbon nitrile having from 2 to 10 carbon atoms.
9. The process of claim 8 wherein said solvent is acetonitrile.
10. The process of claim 1 wherein the catalyst/solvent system is (b).
11. The process of claim 10 wherein said quaternary salt is a quaternary ammonium halide.
12. The process of claim 11 wherein said halide is tetraethyl ammonium halide.

References Cited
UNITED STATES PATENTS

| | | | |
|---|---|---|---|
| 2,214,352 | 9/1940 | Schoeller et al. | 260—615 X |
| 2,856,370 | 10/1958 | Meutterties | 260—615 X |
| 2,934,505 | 4/1960 | Gurgiolo | 260—615 X |
| 2,956,959 | 10/1960 | Detter | 260—615 X |

OTHER REFERENCES

Hansson, "Chem. Abstracts," vol. 48, p. 12525f (1954).
Staudinger et al., "Deut. Chem. Ber.," vol. 62B, pp. 2395–2405 (1929).

LORRAINE A. WEINBERGER, *Primary Examiner.*
RICHARD K. JACKSON, *Assistant Examiner.*